(12) United States Patent
Waldron et al.

(10) Patent No.: US 11,377,799 B2
(45) Date of Patent: Jul. 5, 2022

(54) TREATMENT COMPOSITION CONTAINING A MOLD INHIBITING AGENT AND A WATER REPELLENT HAVING REDUCED FOAMING PROPERTIES

(71) Applicant: LONZA, LLC, Morristown, NJ (US)

(72) Inventors: Craig Waldron, Acworth, GA (US); Patrick Flaherty, Cumming, GA (US); Tyler Corse, Murrieta, CA (US)

(73) Assignee: ARXADA, LLC, Morristown, NJ (US)

(*) Notice: Subject to any disclaimer, the term of this patent is extended or adjusted under 35 U.S.C. 154(b) by 0 days.

(21) Appl. No.: 17/178,541

(22) Filed: Feb. 18, 2021

(65) Prior Publication Data
US 2021/0180257 A1    Jun. 17, 2021

Related U.S. Application Data

(62) Division of application No. 15/688,986, filed on Aug. 29, 2017, now abandoned.

(60) Provisional application No. 62/383,045, filed on Sep. 2, 2016.

(51) Int. Cl.

| | |
|---|---|
| D21H 21/36 | (2006.01) |
| D21H 27/32 | (2006.01) |
| D21H 27/18 | (2006.01) |
| C09D 5/16 | (2006.01) |
| B32B 13/08 | (2006.01) |
| D21H 21/12 | (2006.01) |
| A01N 25/02 | (2006.01) |
| A01N 25/04 | (2006.01) |
| A01N 55/02 | (2006.01) |
| A01N 59/16 | (2006.01) |
| B32B 29/00 | (2006.01) |
| C09D 5/00 | (2006.01) |
| C09D 5/14 | (2006.01) |
| D21H 19/12 | (2006.01) |
| D21H 21/16 | (2006.01) |
| E04C 2/04 | (2006.01) |

(52) U.S. Cl.
CPC ............. *D21H 21/36* (2013.01); *A01N 25/02* (2013.01); *A01N 25/04* (2013.01); *A01N 55/02* (2013.01); *A01N 59/16* (2013.01); *B32B 13/08* (2013.01); *B32B 29/002* (2013.01); *C09D 5/00* (2013.01); *C09D 5/14* (2013.01); *C09D 5/1625* (2013.01); *C09D 5/1687* (2013.01); *D21H 19/12* (2013.01); *D21H 21/12* (2013.01); *D21H 21/16* (2013.01); *D21H 27/18* (2013.01); *D21H 27/32* (2013.01); *E04C 2/043* (2013.01); *B32B 2250/03* (2013.01); *B32B 2255/12* (2013.01); *B32B 2255/24* (2013.01); *B32B 2255/26* (2013.01); *B32B 2307/718* (2013.01); *B32B 2307/7145* (2013.01); *B32B 2307/73* (2013.01); *B32B 2419/00* (2013.01)

(58) Field of Classification Search
CPC ......... D21H 21/36; D21H 21/12; D21H 21/16
See application file for complete search history.

(56) References Cited

U.S. PATENT DOCUMENTS

| | | | |
|---|---|---|---|
| 4,327,146 A | 4/1982 | White | |
| 5,169,561 A * | 12/1992 | Gentle | B01D 19/0409 514/642 |
| 5,962,119 A | 10/1999 | Chan | |
| 6,303,663 B1 | 10/2001 | Broadbent et al. | |
| 6,790,277 B2 | 9/2004 | Ayambem | |
| 6,893,752 B2 | 5/2005 | Veeramasuneni et al. | |
| 2004/0005484 A1 | 1/2004 | Veeramasuneni et al. | |
| 2004/0149409 A1* | 8/2004 | Klimpl | D21H 21/36 162/161 |
| 2004/0187741 A1 | 9/2004 | Liu et al. | |
| 2005/0119406 A1* | 6/2005 | Duffy | C08L 83/00 524/862 |
| 2006/0035097 A1* | 2/2006 | Batdorf | A01N 25/24 428/507 |
| 2006/0171976 A1 | 8/2006 | Weir et al. | |
| 2006/0194072 A1* | 8/2006 | Toreki | E04C 2/043 428/537.5 |
| 2006/0265999 A1* | 11/2006 | Dupre | B28B 11/24 52/745.19 |
| 2007/0082170 A1 | 4/2007 | Colbert et al. | |
| 2008/0057346 A1* | 3/2008 | Peuramaki | B32B 13/08 428/703 |
| 2010/0016394 A1 | 1/2010 | Enzien | |
| 2011/0024067 A1* | 2/2011 | Anderson | D21H 21/16 162/161 |
| 2011/0151129 A1* | 6/2011 | Castillo | D21H 17/68 427/397.8 |

(Continued)

OTHER PUBLICATIONS

PCT/US2017/049123 International Search Report and Written Opinion dated Jan. 15, 2018.

(Continued)

*Primary Examiner* — Jasper Saberi
(74) *Attorney, Agent, or Firm* — Dority & Manning, P.A.

(57) ABSTRACT

The present disclosure is generally directed to a mold inhibiting composition. The mold inhibiting composition can be used to treat various different substrates, including building material products, such as facing layers for wallboard. In general, any suitable paper product may be treated with the composition. The composition contains a mold inhibiting agent in combination with a defoamer. The mold inhibiting agent may comprise a pyrithione. The defoamer, on the other hand, may comprise an oil based defoamer containing metal oxide particles, such as silica particles. The mold inhibiting composition can be combined with a water repellent and applied to a substrate without excessive amounts of foam or froth being formed. The defoamer is selected so as to not interfere with the resulting water absorption properties of the product.

17 Claims, No Drawings

(56) References Cited

U.S. PATENT DOCUMENTS

| | | | |
|---|---|---|---|
| 2012/0088114 A1* | 4/2012 | Rohlf | D21H 13/36 428/537.7 |
| 2012/0256624 A1* | 10/2012 | Takewaki | C11D 9/36 324/307 |
| 2014/0228511 A1 | 8/2014 | Li et al. | |
| 2014/0272404 A1 | 9/2014 | Shake et al. | |
| 2015/0030862 A1* | 1/2015 | Rohlf | D21H 19/32 428/447 |
| 2015/0351383 A1 | 12/2015 | Kolari et al. | |

OTHER PUBLICATIONS

"Foamkill Adhesives & Glue", Crucible Chemical Company, 2015, https://cruciblechemical.com/wp-conent/uploads/2018/09/Foamkili-for-Adhesives-.pdf.

* cited by examiner

TREATMENT COMPOSITION CONTAINING A MOLD INHIBITING AGENT AND A WATER REPELLENT HAVING REDUCED FOAMING PROPERTIES

RELATED APPLICATIONS

The present application is based on and claims priority to U.S. Provisional Patent application Ser. No. 62/383,045 filed on Sep. 2, 2016 and is a divisional of U.S. patent application Ser. No. 15/688,986 filed on Aug. 19, 2017, both of which are incorporated herein by reference.

BACKGROUND

One of the most common ways of constructing walls and barriers includes the use of inorganic wallboard panels or sheets, such as gypsum wallboard, often referred to simply as "wallboard" or "drywall." Wallboard can be formulated for interior, exterior, and wet applications. The use of wallboard, as opposed to conventional wet plaster methods, is often desirable because the installation of wallboard is ordinarily less costly than installation of conventional plaster walls.

Generally, wallboard is conventionally produced by enclosing a core of an aqueous slurry of calcined gypsum and other materials between two large sheets of board cover paper. Various types of cover paper are known in the art, as are other types of facing materials. After the gypsum slurry has set (i.e., reacted with the water from the aqueous slurry) and dried, the sheet is cut into standard sizes.

Many building material products such as wallboard are well suited for absorbing moisture. For instance, moisture can be absorbed by the facing materials and can also be absorbed by the core material of wallboard. Moisture can be absorbed by these materials especially in high humidity environments, such as in bathrooms and basements. These building material products can also become wet due to accidental spills or due to leaks in the plumbing or leaks in the exterior of the building. Unfortunately, even small amounts of moisture can stimulate the growth of many mold organisms. Some mold organisms are sporulating fungal organisms that, when they mature, spew out allergenic matter that can detrimentally affect indoor air quality. Consequently, when mold infestation occurs in a building or home, the owners typically have to tear down walls and replace with new materials.

Various different anti-mold agents have been developed in the past and incorporated into building material products, such as wallboards. For instance, in the past, pyrithione has been used to prevent mold growth on or in wallboards. For instance, mold-resistant wallboards are disclosed in U.S. Patent Publication No. 2006/0171976, in U.S. Patent Publication No. 2007/0082170 and in U.S. Pat. No. 6,893,752, which are all incorporated herein by reference. The anti-mold agents, for instance can be applied to the facing materials during manufacture of the wallboard.

In addition to anti-mold agents, the facing materials, which are typically made from a paper, are also typically treated with a water repellent in order to reduce the water absorption properties of the material. In one embodiment, for instance, the anti-mold agent is combined with a water repellent in an aqueous dispersion or in an oil and water dispersion and applied to the facing layers. More particularly, these compositions are applied to the facing layer while the facing layer is being produced in a wet laid paper making process. For example, an aqueous dispersion containing one or more anti-mold agents and one or more water repellents can be applied to the facing layers after the facing layer has been formed but prior to complete drying of the layer. In the past, however, problems have been encountered in effectively incorporating the anti-mold agent and the water repellent into the paper layer being formed. For instance, problems have been experienced with excessive foaming and frothing of the aqueous dispersion as the composition is applied to the paper. The foaming of the composition cannot only interfere with the process machinery, but can also prevent the composition from being uniformly applied to the layer.

Prior use of defoamers have only created further problems. Defoamers, for instance, can not only adversely interfere with the other components but can significantly and adversely impact the water absorption properties of the paper product. Consequently, defoamers may serve to reverse the effects of the water repellent.

Thus, a need currently exists for a process for effectively applying an anti-mold agent and a water repellent to facing layers and other paper products during manufacture of the products. In particular, a need exists for an aqueous composition containing an anti-mold agent and a water repellent that can be applied to paper products during their formation that does not create excessive foaming while also preserving the water repellent properties of the paper layer. A need also exists for paper products made according to the process and to laminated products containing the paper, including building material products, such as wallboard.

SUMMARY

The present disclosure is generally directed to a water repellent and mold inhibiting composition for use in building material products that contains a mold inhibiting agent, such as pyrithione, in combination with a water repellent agent. According to the present disclosure, the water repellent and mold inhibiting composition further contains a defoamer containing a defoaming agent that has been found to not only reduce foam and frothing of the composition when applied to a substrate but has also been found not to interfere with the resulting water repellent properties of the product.

In one embodiment, the present disclosure is directed to a building material product. The building material product includes a core that is comprised of gypsum. The core includes a first face and a second and opposite face. At least one facing layer is adhered to the first face, to the second face, or to both the first face and the second face of the core. The facing layer may comprise a pulp fiber substrate, such as a paper substrate. Each facing layer, for instance, may comprise a paper having a basis weight of from about 38 lbs per 1,000 ft$^2$ to about 50 lbs per 1,000 ft$^2$ (as used herein 1,000 ft$^2$ is designated as "MFS"). In accordance with the present disclosure, as least one of the facing layers is treated with a water repellent and mold inhibiting composition. The water repellent and mold inhibiting composition comprises a water repellent agent, a mold inhibiting agent, and a defoamer. The defoamer comprises an oil carrier and a defoaming agent. In one embodiment, for instance, the defoaming agent may comprise hydrophobic silica particles. The defoamer is present in the water repellent and mold inhibiting composition in an amount of at least about 0.08% by weight, such as in an amount of at least about 0.1% by weight, such as in an amount of at least about 0.3% by weight, such as in an amount of at least about 0.5% by weight. For example, the defoamer may be present in the composition in an amount up to about 10% by weight, such as in an amount up to about 5% by weight.

The oil carrier contained within the defoamer can comprise a hydrocarbon oil. In various embodiments, the oil carrier can comprise a mineral oil, a vegetable oil, or a white oil. The oil carrier may comprise any suitable petroleum distillate. In addition to the oil carrier and the defoaming agent, the defoamer may also contain a wax. The wax may comprise a stearamide wax, a paraffin wax, an ester wax, a fatty alcohol wax, or mixtures thereof. Once applied to a facing layer, such as a paper product, the defoamer can be present in the dried product in an amount greater that about 10 grams per MFS, such as from about 10 grams per MFS to about 50 grams per MFS.

Of particular advantage, it was discovered that the above defoamer does not adversely interfere with the water repellent agent and/or significantly affect the water repellent characteristics of the resulting paper product. The water repellent agent may be applied to the facing layer as an oil and water dispersion containing a silicone copolymer.

The mold inhibiting agent included in the composition is contained in at least one facing layer, in the core, or in both the core and the facing layers. The mold inhibiting agent may comprise a pyrithione.

The pyrithione present in the building material product may comprise a metal pyrithione such as zinc pyrithione, sodium pyrithione, or mixtures thereof.

The pyrithione may be in the form of particles, particularly small particles. For instance, 100% of the particles may have a particle size of less than 5 microns, while at least 90%, such as at least 70% of the particles have a particle size of less than 2 microns, such as less than 1 micron.

In an alternative embodiment, a liquid pyrithione may be used.

The pyrithione may be present in the paper product or in one component of a building material product at a concentration of from about 50 ppm to about 10,000 ppm, such as from about 100 ppm to about 5,000 ppm, such as from about 500 ppm to about 3,500 ppm.

When the mold inhibiting agent comprises a pyrithione, the mold inhibiting agent may be present in the composition in combination with zinc oxide particles.

Building material products, such as wallboard, treated in accordance with the present disclosure can have excellent mold-resistant properties. For instance, when tested according to ASTM Test D3273, wallboards treated in accordance with the present disclosure can have a rating of greater than 7, such as greater than 8, such as greater than 9, and can even have a rating of 10. In addition, the one or more facing layers can have a Cobb water absorption value of less than about 100 grams per $m^2$, such as less than about 90 grams per $m^2$, such as less than about 80 grams per $m^2$, such as less than about 70 grams per $m^2$.

In addition to a building material product, the present disclosure is also directed to any suitable paper product treated in accordance with the present disclosure. The paper product can comprise a paper layer treated with a composition described above. In addition to a facing layer of a building material product, the paper product treated in accordance with the present disclosure may comprise, for instance, a flooring felt, a roofing felt, an insulation material, and the like. In general, any suitable paper product may be treated in accordance with the present disclosure.

The present disclosure is also directed to a mold inhibiting composition as described above that may be used in conjunction with a water repellent. The mold inhibiting composition for use in paper products may comprise a mold inhibiting agent combined with a defoamer as described above. The mold inhibiting composition may be formulated as a concentrate that is then diluted and optionally combined with a water repellant composition. When present as a concentrate, for instance, the mold inhibiting composition may contain water in an amount less than about 50% by weight, such as in an amount less than about 40% by weight, such as in an amount less than about 30% by weight, such as in an amount less than about 20% by weight.

The present disclosure is also directed to a process for producing a paper with mold and moisture inhibiting properties. The process includes the steps of first forming a paper web from an aqueous suspension of pulp fibers. A water repellent and mold inhibiting composition is applied to at least one side of the paper web. In one embodiment, the composition is applied to the paper web after the paper web has been formed but prior to final drying such that the paper web is in a wet state or semi-dry state.

In one embodiment, the water repellent and mold inhibiting composition comprises from about 3% to about 10% by weight of a water repellent dispersion containing a water repellent agent and from about 7% to about 20% by weight of a mold inhibiting composition. The mold inhibiting composition can comprise an mold inhibiting agent combined with a defoamer, wherein the defoamer comprises an oil carrier, a defoaming agent and optionally a wax. The defoaming agent, for instance, may comprise hydrophobic metal oxide particles, such as silica particles. The defoamer is present in the composition in an amount of at least about 0.08% by weight, such as an amount of at least 0.3% by weight, such as an amount of at least 0.5% by weight. The composition further contains water. Water may be contained in the composition in an amount of at least about 70% by weight, such as an amount of at least 80% by weight, such as an amount of at least 85% by weight.

After the composition is applied to the paper web, the paper web is dried to form a paper product. In one embodiment, the paper product can be used to form a building material product containing a core of gypsum. The resulting paper product can have a Cobb water absorption value of less than about 90 grams per $m^2$. The paper product can have a basis weight of from about 38 lbs per MFS to about 50 lbs per MFS.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

Building materials, such as wallboards, are currently treated with a mold inhibiting agent, such as a pyrithione complex. The pyrithione complex may be contained in the core and also in the facing layer made from paper. In some embodiments, the mold inhibiting agent is combined with a water repellent and applied to a product, such as the facing layer of a building material. Problems, however, have been experienced in the past in excessive foaming and frothing when the composition is applied. In this regard, the present disclosure is directed to a mold inhibiting composition that can be used in conjunction with a water repellent that contains a mold inhibiting agent in combination with a defoamer. More particularly, it was discovered that a defoamer containing an oil carrier in combination with a defoaming agent has been found to not only reduce or eliminate the formation of foam when the product is used, but has also been found not to significantly interfere with the water repellent properties of the resulting product and/or with the efficacy of the water repellent agent.

The water repellent and mold inhibiting composition of the present disclosure can provide numerous benefits and advantages when applied to a paper product. For instance, a paper product can be imparted with water repellent properties and with mold inhibiting properties through an easy to apply topical application process in which foaming of the composition is minimized or eliminated. By inhibiting the formation of foam, the composition of the present disclosure, when applied to a substrate, would generally be more uniform across or over the surface area of the product. In addition, minimizing foam allows the process to achieve or maintain a higher level of cleanliness that minimizes contamination in the machinery and reduces or eliminates over application of the composition and/or spills or messes that can result from the formation of foam.

A water repellent and mold inhibiting composition made in accordance with the present disclosure may be incorporated into any suitable building product, such as wallboard. The combination of components, when applied to a facing layer covering the gypsum, is able to inhibit the growth of mold organisms for a prolonged period of time while at the same time reducing the water absorption properties of the substrate. Of particular advantage, when tested according to ASTM Test D3270, the mold inhibitory composition of the present disclosure is capable of demonstrating efficacy to obtain a score greater than 7, such as greater than 8, such as greater than 9, such as even a score of 10 where no visible growth of mold is observed even when the wallboard product is subjected to a humid environment. In addition, facings treated according to the present disclosure can also display excellent water repellency properties. For instance, the facing can have a Cobb water absorption value of less than about 100 grams per $m^2$, such as less than about 90 grams per $m^2$, such as less than about 80 grams per $m^2$, such as less than about 70 grams per $m^2$. The Cobb water absorption value is generally greater than about 10 grams per $m^2$, such as greater than about 20 grams per $m^2$ in certain applications. Cobb testing can be completed at 3 minutes using water at a temperature of 120° F.

In addition to facing layers, however, it should be understood that the composition of the present disclosure can be used in a variety of other applications. For example, the composition is well suited to treating any suitable paper product particularly porous products. The composition, for instance, is well suited for any application where a paper products needs water repellent and antimicrobial properties. Other products that may be treated in accordance with the present disclosure, for instance, include flooring products, roofing felts, insulation products, and the like.

As described above, wallboard is conventionally produced by enclosing a core of an aqueous slurry of calcined gypsum and other components between one or more facing layers. The facing layer may comprise different materials. In one embodiment, the facing layer contains pulp fibers. In this regard, the facing layer may comprise a paper, such as a paperboard. In one embodiment, for instance, the facing layer may be made from recycled pulp fibers, such as recycled newsprint. The facing can have a basis weight of generally greater than about 20 lbs per MFS, such as greater than about 25 lbs per MFS, such as greater than about 30 lbs per MFS, such as greater than about 35 lbs per MFS, such as greater than about 38 lbs per MFS. The basis weight is generally less than about 60 lbs per MFS, such as less than about 55 lbs per MFS, such as less than about 50 lbs per MFS, such as less than about 48 lbs per MFS. In an alternative embodiment, the facing layer may comprise starch or a starch layer. In another embodiment, starch may be used to attach a pulp containing facing layer to the core material.

The slurry used to make the core of wallboard comprises calcined gypsum alone or in combination with various other materials. In one embodiment, for instance, the core may further include filler materials, binders, and the like.

Gypsum is typically obtained naturally from gypsum rock. The gypsum rock is ground to a desired fineness and then undergoes calcination. Calcination is performed by heating the gypsum rock in order to remove moisture and produce calcium sulfate hemihydrate. Calcium sulfate hemihydrate, when mixed with water, will set and form the core material.

When producing wallboard, an aqueous slurry of calcined gypsum and other components can be continuously deposited between two facing layers. The slurry can contain any calcined gypsum including calcium sulfate hemihydrate, calcium sulfate anhydrite or both. Calcium sulfate hemihydrate can produce at least two crystal forms, the alpha and beta forms. Beta or alpha calcium sulfate hemihydrate may be used.

In some embodiments, additives are included in the gypsum slurry to modify one or more properties of the final product. Such additives can include starches, defoamers, surfactants, dispersants and the like. Such additives can include naphthalene sulfonates and wax emulsions. A set accelerator may also be present comprising calcium sulfate dihydrate co-ground with sugar and heated to 250° F. (121° C.) to caramelize the sugar.

A trimetaphosphate compound can be added to the gypsum slurry in some embodiments to enhance the strength of the product and to reduce sag of the set gypsum. The concentration of the trimetaphosphate compound can be from about 0.1% to about 2.0% based on the weight of the calcined gypsum. Exemplary trimetaphosphate salts include sodium, potassium or lithium salts of trimelaphosphate.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). The pregelatinized starch can be added to the mixture used to form the set gypsum composition such that it is present in an amount of from about 0.5% to about 10% percent by weight of the set gypsum composition.

Gypsum panels are typically greater than ⅛ inch in thickness. The gypsum panels can be from about ⅜ inch (9.5 mm) to about 2 inches (51 mm), from about ¾ inch (19 mm) to about 1¼ inch (32 mm) or from about ½ inch (13 mm) to about 1 inch (25 mm) in thickness.

In accordance with the present disclosure, a water repellent and mold inhibiting composition may be applied to one of the facing layers, may be applied to both facing layers, or may be applied to both the facing layers and the aqueous slurry that provides the core.

The composition of the present disclosure can include the combination of mold inhibiting composition with a water repellent composition or dispersion. Alternatively, the mold inhibiting composition can be applied separately from the water repellent composition albeit to the same substrate at approximately the same time.

The mold inhibiting composition generally comprises an aqueous solution, dispersion or suspension that contains a mold inhibiting agent and a defoamer. In accordance with the present disclosure, a defoamer is selected that not only reduces foam during application of the product but also does not interfere with the water repellent agent and/or adversely impact the water absorption characteristics of the substrate in a substantial manner.

The defoamer for use in the present disclosure comprises an oil carrier and a defoaming agent. The oil carrier, for instance, may comprise any suitable hydrocarbon oil and/or petroleum distillate. Particular oils that may be used include mineral oil, vegetable oil, a white oil, or any other oil that is insoluble in the foaming medium.

In one embodiment, the defoamer is silicone-free or contains relatively low amounts of silicone, such as silicone oil. In various embodiments, the defoamer may contain silicone in relatively low amounts, such as less than about 10% by weight, such as less than about 2% by weight, such as less than about 1 by weight, such as less than about 0.5% by weight, such as less than about 0.1 by weight.

In addition to the oil carrier, the defoamer contains a defoaming agent. In one embodiment, the defoaming agent comprises metal oxide particles. For example, in one embodiment, the defoaming agent comprises silica particles, such as hydrophobic silica particles. The silica particles can be present in the defoamer in an amount generally less than about 20% by weight, such as in an amount less than about 15% by weight, such as in an amount less than about 10% by weight, such as in an amount less than about 2% by weight. The silica particles are generally present in an amount greater than about 0.1% by weight, such as in an amount greater than about 0.5% by weight, such as in an amount greater than about 0.8% by weight, such as in an amount greater than about 1% by weight.

In addition to an oil carrier and a defoaming agent, the defoamer may contain various other ingredients and components. In one embodiment, for instance, the defoamer may contain a wax. The wax, for instance, may comprise a stearamide wax, a paraffin wax, an ester wax, and/or a fatty alcohol wax. In one particular embodiment, the defoamer comprises an ethylene bis stearamide wax. The wax is generally present in the defoamer in an amount less than about 10% by weight, such as in an amount less than about 2% by weight, such as in an amount less than about 1% by weight. The wax is generally present in an amount greater than about 0.1% by weight.

In order to effectively eliminate foaming and/or frothing during application of the mold inhibiting agent and the water repellent, the defoamer can be present in the composition generally in an amount greater than about 0.08% by weight, such as in an amount greater than about 0.3% by weight, such as in an amount greater than about 0.5% by weight, such as in an amount greater than about 0.9% by weight. The defoamer is generally present in an amount less than about 10% by weight, such as in an amount less than about 7% by weight, such as in an amount less than about 5% by weight, such as in an amount less than about 3% by weight, such as in an amount less than about 2% by weight.

The defoamer is combined with a mold inhibiting agent to form a mold inhibiting composition. In general, any suitable mold inhibiting agent can be contained in the composition or mixture of mold inhibiting agents. In one embodiment, the mold inhibiting agent comprises a pyrithione. As used herein, a pyrithione includes pyrithione salts, and particularly polyvalent metal salts of pyrithione. For instance, pyrithione salts can be formed from polyvalent metals such as magnesium, barium, bismuth, strontium, copper, zinc, cadmium, zirconium and mixtures thereof.

Pyrithione is known by several names, including 2 mercaptopyridine-N-oxide; 2-pyridinethiol-1-oxide (CAS Registry No. 1121-31-9); 1-hydroxypyridine-2-thione and 1 hydroxy-2(1H)-pyridinethione (CAS Registry No. 1121-30-8). The sodium derivative ($C_5H_4NOSNa$) is known as sodium pyrithione (CAS Registry No. 3811-73-2). Pyrithione salts are commercially available from Arch Chemicals, Inc., such as Sodium OMADINE™ or Zinc OMADINE™.

The pyrithione may be present in the mold inhibiting composition in different forms. In one embodiment, for instance, the pyrithione may comprise an aqueous dispersion, such as an aqueous dispersion containing zinc pyrithione. The pyrithione may be contained in the aqueous dispersion as particles, and particularly small particles. For instance, the particles can have a particle size such that 100% of the particles have a particle size of less than about 5 microns and at least about 50% of the particles, such as at least about 70% of the particles have a particle size of 2 microns or less, such as 1 micron or less. Particle size can be measured using a laser scattering particle size analyzer, such as a HORIBA LA 910 particle size analyzer.

The particles can be present in the aqueous dispersion in an amount greater than about 30% by weight and in an amount less than about 70% by weight. In one embodiment, for instance, the particles are present in an amount from about 40% to about 60% by weight. The aqueous dispersion can also contain various other components, such as a dispersant and/or a viscosity control agent. The pH of the aqueous dispersion can be from about 6.5 to about 8.5. In an alternative embodiment, the pH can be greater such as from about 9 to about 11 depending upon the ingredients contained in the dispersion.

In an alternative embodiment, the pyrithione may be present in the composition as a solution. For instance, the solution may contain sodium pyrithione. The solution may contain pyrithione in an amount greater than about 25% by weight, such as from about 30% by weight to about 70% by weight. In one embodiment, for instance, the solution can contain pyrithione in an amount from about 35% by weight to about 45% by weight. The solution can have a pH of from about 8.5 to about 10.5 and can contain various other components in addition to the pyrithione and water. For instance, in one embodiment, the solution can contain an amine, which may increase the pH to from about 11 to about 12.

The pyrithione is added to the mold inhibiting composition in an amount sufficient to inhibit the growth of microorganisms, particularly mold. As mentioned above, the pyrithione can be added to one or more facing layers of wallboard and/or to the core. The concentration of pyrithione added to a component of the wallboard can depend upon various different factors. In general, pyrithione is added at a concentration of greater than about 50 ppm and up to a concentration of about 10,000 ppm. More particularly, the pyrithione concentration is generally greater than about 100 ppm, such as greater than about 200 ppm, such as greater than about 300 ppm, such as greater than about 400 ppm, such as greater than about 500 ppm. The concentration is generally less than about 5,000 ppm, such as less than about 3,500 ppm, such as less than about 2,000 ppm. In one embodiment, the concentration of pyrithione in one component of the wallboard can be from about 100 ppm to about 5,000 ppm, such as from about 500 ppm to about 3,500 ppm.

The mold inhibiting composition, in addition to a pyrithione, can also contain one or more potentiators. As used herein, a potentiator is any compound, ion, element, oligomer, or polymer that is capable of increasing the efficacy of the pyrithione. The potentiator may comprise, for instance, a metal chelator, a metal salt which may or may not be a metal chelator, a long chain aliphatic amine, a natural extract, and the like. The long chain aliphatic amine can have a carbon chain length from about 12 carbon atoms to about 60 carbon atoms, such as from about 12 carbon atoms to about 40 carbon atoms, such as from about 12 carbon atoms to about 28 carbon atoms. Examples of long chain aliphatic amines that may be used in accordance with the present disclosure include oleylamine, dodecylamine, or mixtures thereof.

The potentiator may also comprise an enolic ketone, such as an unsaturated enolic ketone. An example of an enolic ketone is tropolone. For example, in one embodiment, a tropolone complex may be used as a potentiator. The tropolone complex may comprise a metal complex, such as a complex with zinc or copper. Tropolone can be synthetically made or can be obtained naturally from cedar wood.

In another embodiment, a copper salt is used as a potentiator, such as a copper amine. For instance, in one embodiment, the potentiator comprises copper ethanolamine.

In still another embodiment, the potentiator may comprise a metal salt of dehydroacetic acid (DHA). For instance, in one embodiment, the potentiator comprises a zinc salt chelate of DHA.

In still another embodiment, the potentiator may also comprise a surfactant. For instance, an amine oxide surfactant may be used, such as a cocamine oxide surfactant. In one particular embodiment, the surfactant comprises N-alkyl ($C_{12}$-$C_{16}$)dimethylamine oxides.

In one embodiment, the mold inhibiting composition may also contain a zinc salt. The zinc salt, for instance, may optionally form a complex with the pyrithione, especially zinc pyrithione. The zinc salt may comprise, for instance, zinc oxide. Zinc oxide may be present in the composition in an amount generally from about 0.001% to about 10% by weight. Other zinc salts that may be present in the composition include zinc salts of organic acids, zinc salts or inorganic acids, zinc hydroxide, and the like. The zinc compound may have multiple purposes. For instance, the zinc compound may increase the efficacy of the pyrithione, provide resistance to UV energy, or prevent the pyrithione from discoloring over time. In various embodiments, the zinc compound may be present in an amount from about 0.01% to about 3% by weight, such as in an amount from about 0.02% to about 0.5% by weight.

The above mold inhibiting composition can be combined with a water repellent composition to form a water repellent and mold inhibiting composition for treating various substrates while inhibiting the formation of foam and froth. Various different types of water repellent compositions may be used. In one embodiment, for instance, the water repellent composition may comprise a silicone emulsion. The water repellent composition, for instance, may contain a water repellent agent comprising a silicone. In one embodiment, the water repellent agent may comprise a curable, silicone copolymer. For example, once dried on a substrate, the water repellent agent may comprise a cured siloxane.

In one embodiment, in addition to a water repellent, the water repellent composition may contain a surfactant, such a non-ionic surfactant, in an oil and water type emulsion. The silicone or water repellent agent can be present in the composition in an amount generally greater than about 5% by weight, such as in an amount greater than about 10% by weight, such as in an amount greater than about 15% by weight, such as in an amount greater than about 20% by weight, such as in an amount greater than about 25% by weight, such as in an amount greater than about 30% by weight. The water repellent agent is generally present in the water repellent composition in an amount less than about 70% by weight, such as in an amount less than about 60% by weight, such as in an amount less than about 55% by weight, such as in an amount less than about 50% by weight.

The water repellent composition may be combined with the mold inhibiting composition to form a water repellent and mold inhibiting composition for application to various substrates, such as facing layers for wallboards and other building products. The water repellent and mold inhibiting composition can contain the water repellent composition in an amount greater than about 2% by weight, such as in an amount greater than about 3% by weight, such as in an amount greater than about 4% by weight. The water repellent composition is generally contained in the water repellent and mold inhibiting composition in an amount less than about 15% by weight, such as in an amount less than about 10% by weight, such as in an amount less than about 8% by weight.

The mold inhibiting composition can generally be present in the water repellent and mold inhibiting composition in an amount greater than about 5% by weight, such as in an amount greater than about 7% by weight, such as in an amount greater than about 8% by weight. The mold inhibiting composition is generally present in the overall composition in an amount less than about 30% by weight, such as in an amount less than about 25% by weight, such as in an amount less than about 20% by weight, such as in an amount less than about 15% by weight, such as in an amount less than about 13% by weight.

The water repellent and mold inhibiting composition can also contain substantial amounts of water. Water can be present in the composition in an amount greater than about 70% by weight, such as in an amount greater than about 75% by weight, such as in an amount greater than about 80% by weight, such as in an amount greater than about 85% by weight. Water is generally present in the composition in an amount less than about 95% by weight, such as in an amount less than about 90% by weight.

The water repellent and mold inhibiting composition of the present disclosure can be used in numerous applications. In one embodiment, the composition can be applied to a paper product as the product is being formed. In order to prevent the composition from foaming, significant amounts of a particular defoamer are present that not only inhibit foaming but also do not interfere with the water repellency properties of the final product. Once the product is dried, for instance, the defoamer can be present on the product in an amount greater than about 5 grams per MFS, such as greater than about 10 grams per MFS, such as greater than about 20 grams per MFS, such as greater than about 25 grams per MFS, such as greater than about 30 grams per MFS. The defoamer is generally present in amount less than about 200 grams per MFS, such as less than about 100 grams per MFS, such as less than about 80 grams per MFS, such as less than about 70 grams per MFS, such as less than about 60 grams per MFS, such as less than about 50 grams per MFS.

In one embodiment, when treating a paper product with the water repellent and mold inhibiting composition of the present disclosure, the process includes the step of first forming a paper web from aqueous suspension of pulp fibers. In addition to pulp fibers, the paper web may contain various other components. For instance, the paper web can contain filler particles and/or synthetic fibers. In one embodiment, the aqueous suspension of fibers is deposited on to a forming surface from a head box. The forming surface may comprise a porous material, such as a screen that allows liquids to drain from the fibers. The embryonic web can be subjected to various pressing steps and/or vacuum in order to drain fluids from the web and to allow the web to form.

In one embodiment, after the paper web is formed but prior to final drying, the water repellent and mold inhibiting composition of the present disclosure can be applied to the web. For example, in one embodiment, the water repellent and mold inhibiting composition can be applied to the web using a water box or any other suitable device. The consistency of the paper web during application of the composition can vary depending upon various factors. In one embodiment, the composition can be applied to the paper web while the paper web has a solids content of greater than about 80%, such as greater than about 85%, such as greater than about 90%, such as from about 90% to about 95%. In an alternative embodiment, however, the composition can also be applied to the paper product when the paper product contains greater amounts of water. For instance, in other embodiments, the solids content of the paper web can be between about 25% to about 60%, such as from about 25% to about 40%.

The amount of composition applied to the paper web can vary depending upon the particular application and the desired result. In general, the water repellent and mold inhibiting composition as described above can be applied to the paper web in an amount greater than about 1,000 grams of fluid per MFS, such as greater than about 1,200 grams of fluid per MFS, such as greater than about 1,500 grams of fluid per MFS, such as greater than about 1,600 grams of fluid per MFS. The composition is generally applied in an amount less than about 5,000 grams of fluid per MFS, such as in an amount less than about 3,000 grams of fluid per MFS, such as in an amount less than about 2,500 grams of fluid per MFS, such as in an amount less than about 2,000 grams of fluid per MFS.

After application to the paper web, the paper web is dried and further processed as desired depending upon the end use application. In one embodiment, the dried paper web can contain the water repellent agent in an amount from about 22 grams per MFS to about 110 grams per MFS, such as from about 26 grams per MFS to about 70 grams per MFS, such as from about 26 grams per MFS to about 50 grams per MFS. The mold inhibiting agent may be present on the dried paper web in an amount from about 30 grams per MFS to about 250 grams per MFS, such as from about 50 grams per MFS to about 150 grams per MFS, such as from about 55 grams per MFS to about 100 grams per MFS. The defoamer, on the other hand, may be present on the dried web in an amount from about 1 gram per MFS to about 50 grams per MFS, such as from about 12 grams per MFS to about 30 grams per MFS, such as from about 12 grams per MFS to about 20 grams per MFS.

In one particular application, the paper product formed in accordance with the present disclosure may comprise a facing for a building material product, such as a wallboard. Wallboards typically include two facings, a first facing that is exposed when the product is installed, and a second facing that faces the interior of the wall. The exposed facing may have a white appearance and may be configured to accept paint or wallpaper. The facing that faces the interior of the wall, on the other hand, may have a grey appearance. Both facings may have a basis weight of generally from about 30 lbs/MFS to about 50 lbs/MFS. Once treated in accordance with the present disclosure, in addition to having excellent anti-mold properties, the facings also are water resistant. For instance, the facings can have a Cobb water absorption value of less than about 90 grams per $m^2$, such as less than about 80 grams per $m^2$, such as less than about 175 grams per $m^2$.

In one embodiment, after the facings are formed, the facings are wound into a roll and then fed into a process for forming the drywall. In particular, an aqueous suspension of drywall material comprising gypsum can be deposited in between the two facing layers and dried. The resulting drywall can then be cut into sheets having desired dimensions for use in constructing new houses and buildings.

The present disclosure may be better understood with reference to the following examples.

Examples

The following experiments were conducted to show some of the benefits and advantages of the present disclosure. Various different water-based compositions containing a water repellent and a mold inhibiting agent were formulated and tested with various different defoamers for their foaming properties. The water repellent composition comprised a silicone emulsion containing a curable siloxane. The mold inhibiting composition, on the other hand, contained pyrithione as a mold inhibiting agent. The pyrithione was present in combination with zinc oxide.

The base formulation of the composition is provided in Table 1 below. The water repellent was a non-ionic surfactant-stabilized aqueous emulsion of a curable modified silicone copolymer. The mold inhibiting compositions included a dispersion 1 (Z1) which contained 37% zinc pyrithione (ZPT) and 12% zinc oxide by weight while dispersion 2 (Z2) contained 48% zinc pyrithione by weight. Additional Z1 and Z2 samples containing 0.1% and 1.0% of one of three defoamers were also formulated. Defoamer 1 (D1) was an oil-based silica emulsion/dispersion in accordance with the present disclosure. D1 also contained an ethylene bis stearamide wax. The oil carrier comprised mineral oil. Defoamer 2 (D2) was a mixture of polysiloxanes and hydrophobic solids in polyglycols; and Defoamer 3 (D3) contained a mixture containing polysiloxanes and glycol components.

TABLE 1

| Base formulations | | | | | |
|---|---|---|---|---|---|
| Component | % Component | % Solids Component | Solids Contribution, % | % ZPT (Z1) | % ZPT (Z2) |
| Tap water | 85.3 | — | — | — | — |
| Water Repellant | 4.9 | 44 | 2.2 | — | — |
| Mold Inhibiting Dispersion (Z1 = 48% active) (Z2 = 38% active) | 9.8 | 50 | 4.9 | 4.7 | 3.7 |
| Total Solids | | | 7.1 | | |

Fluid samples were prepared by weighing approximately 23 grams of the mold inhibiting dispersion (Z1 for test samples 1, 2, 3, 4 and Z2 for samples 5, 6, 7, and 8) and 12 grams of the water repellent into about 200 mL of tap water. Defoamer was added to test samples 2-4 and 6-8 in amounts sufficient to reach target levels of about 1000 ppm in the test solution. Control sample 1 was prepared by adding approximately 12 grams of the water repellent to 228 grams of tap water. Control samples 3-4 were prepared by weighing approximately 0.25 grams of defoamer and 12 grams of the water repellent into 228 mL of tap water.

Fluid samples were placed into a 50° C. oven for about an hour prior to testing or application to roughly simulate the mill application conditions. In addition, the fluid samples containing defoamer were also placed in the oven for one month to assess any potential impact on dispersion consistency and/or stability.

Foaming/frothing potential was evaluated by applying shear to a known volume of test fluid (about 210 to 245 mL in a 400-mL plastic beaker) for 1 minute using a 1-inch diameter Cowles blade and a Dispermat high speed mixer run at 2500 rpm. The change in volume of the fluid sample (i.e. the foam or froth) was immediately measured (in mL) after the mix period using a graduated cylinder, and the time required for the foam/froth to dissipate was determined.

The following results were obtained:

TABLE 2

Foaming Characteristics of Fluid Samples

| Sample | Foaming Characteristics[1] | Emulsion/Dispersion Compatibility/stability | |
|---|---|---|---|
| Control 1 | +++ | In WB fluid[2] | In ZPT Dispersion |
| Control 2 (w/0.1% D1) | − | Excellent | N/A |
| Control 3 (w/0.1% D2) | − | Excellent | N/A |
| Control 4 (w/0.1% D3) | ++ | Excellent | N/A |
| Sample 1 (Z1) | ++ | Good | N/A |
| Sample 2 (Z1 w/0.1% D1) | − | Excellent | B |
| Sample 3 (Z1 w/0.1% D2) | ++ | Poor | C |
| Sample 4 (Z1 w/0.1% D3) | + | Fair | B |
| Sample 5 (Z2) | + | Fair | N/A |
| Sample 6 (Z2 w/0.1% D1) | + | Good | A |
| Sample 7 (Z2 w/0.1% D2) | + | Poor | B |
| Sample 8 (Z2 w/0.1% D3) | ++ | Fair | A |

[1]Foaming characteristics: +++ = relatively stable foam, ≥80 mL foam height, 90% dissipation times of >10 min.; ++ = moderate amount of less stable foam, 20 to 40 mL foam height, 90% dissipation time 5 to 15 min.; + = low foam, ≤5 mL foam height, 90% dissipation times of 3 min.; − = no foam
[2]Compatibility: Excellent = little or no residues; Good = slight amount of residue noted; Fair = moderate amount of residue noted; Poor = significant residues observed
3. Stability: A = no separation or thickening of dispersion; B = slight separation and/or thickening of dispersion; C = significant separation and/or thickening of dispersion

TABLE 3

Antifoam Efficacy Test Results
400 mL beaker, high speed disperser unit with 1-inch Cowles blade, 500 mL graduated cylinder Samples placed in a 50° C. oven for 1 hour, 230 to 240 mL of fluid were poured into the beaker, mixed for 1 minute at 2000 rpm, then decanted immediately into graduated cylinder. Foam height and dissipation time (90%) were measured.

| Sample No. | Average foam height, mL | 90% Dissipation Time, min. | Residue Formation |
|---|---|---|---|
| Control 1 | 80 | 10 to 20 | None |
| Control 2 (w/0.1% D1) | 0 | n/a | None |
| Control 3 (w/0.1% D2) | 0 | n/a | None |
| Control 4 (w/0.1% D3) | 20 | 10 to 15 | None |
| Sample 1 (Z1) | 5 | <3 | Moderate |
| Sample 2 (Z1 w/0.1% D1) | 5 | <3 | Slight |
| Sample 3 (Z1 w/ 0.1% D2) | 5 | <3 | Significant |
| Sample 4 (Z1 w/0.1% D3) | 25 | 5 to 10 | Moderate |
| Sample 5 (Z2) | 35 | 5 to 10 | Slight |
| Sample 6 (Z2 w/ 0.1% D1) | 0 | n/a | None |
| Sample 7 (Z2 w/0.1% D2) | 30 | 3 to 5 | Significant |
| Sample 8 (Z2 w/ 0.1% D3) | 20 | 5 to 10 | Moderate |

Residue Formation:
None = <1% of calculated total solids content
Slight = estimated to be ≤10% of calculated total solids content
Moderate = estimated to be 10 to 30% of calculated total solids content
Significant = estimated to be >30% of calculated total solids content Following foam testing, the test fluids were applied to A4 sized pieces (8.27×11.69 in=0.7 ft$^2$=21×30 cm=630 cm$^2$) of sample paper, consisting of manila machine finished paper (basis weight of about 43 lbs./MSF) as board face sheet and newsprint paper (basis weight of about 46 lbs./MSF) as board back sheet. Using foam applicators, the fluids were applied to completely wet the designated side of each paper sheet specimen. The excess fluid was quickly wiped off of the paper's surface using an absorbent paper towel, and the specimen was then weighed immediately to determine the amount of wet fluid applied. The targeted pick-up rate for the emulsion/dispersion treatment fluid was 3.8 lbs./MSF (1725 grams fluid per MSF paper=64 to 81 grams ZPT/MSF). Thus, the target application amount of fluid to apply to each A4-sized paper specimens (on the finished or cylinder side of sheet) was 1.3 grams (which would be equivalent to approximately 1725 grams fluid per MSF, or 1.725 grams/ft$^2$, or 0.002 g/cm$^2$).

Water absorption (in g/m$^2$) of the treated paper samples was measured using the Cobb test. Using Fibro ACT (Automatic Cobb Tester), three minute dynamic Cobb measurements were made on replicates of each sample using water heated to approximately 50° C.

TABLE 4

Water Absorptivity Properties of Treated Paper

| | Increase in Cobb Value, g/m2 (% Δ) | |
|---|---|---|
| Sample | Machine Finished | Newsprint |
| Control 1 | — | — |
| Control 2 (w/0.1% D1) | 3.52 (6%) | 1.55 (3%) |
| Control 3 (w/0.1% D2) | 8.34 (15%) | 14.58 (25%) |
| Control 4 (w/0.1% D3) | 3.40 (6%) | 12.18 (21%) |
| Sample 1 (Z1) | — | — |
| Sample 2 (Z1 w/0.1% D1) | 0.97 (2%) | 0.53 (<1%) |
| Sample 3 (Z1 w/0.1% D2) | 10.67 (18%) | 7.07 (11%) |
| Sample 4 (Z1 w/0.1% D3) | 5.27 (9%) | 0.73 (1%) |
| Sample 5 (Z2) | — | — |
| Sample 6 (Z2 w/0.1% D1) | −0.20 (0%) | 0.97 (1%) |
| Sample 7 (Z2 w/0.1% D2) | 5.43 (9%) | 5.24 (8%) |
| Sample 8 (Z2 w/0.1% D3) | −0.63 (0%) | 5.07 (8%) |

Samples 2-4 and 6-8 were then reformulated containing 1% by weight of the corresponding defoamer product. It was observed that the (D1) defoamer produced the least amount of residues and was compatible with the water repellent. The (D3) defoamer product, on the other hand, caused some separation and/or gelling.

During testing, it was noted that the water repellent produced significant amounts of foam. Compositions containing both the water repellent and the mold inhibiting composition also exhibited stable foam. Defoamer (D1) in accordance with the present disclosure significantly and dramatically reduced or eliminated foaming in all fluids. This result was surprising and unexpected in view of the performance of the other defoamer products. Of particular advantage, the (D1) defoamer in accordance with the present disclosure also preserved the water repellent properties of the resulting paper.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A process for producing a paper with mold and moisture inhibiting properties, comprising:
    forming a paper web from an aqueous suspension of pulp fibers;
    applying to a side of the paper web a water repellent and mold inhibiting composition, the water repellent and mold inhibiting composition comprising
        a water repellent dispersion containing a water repellent agent, the water repellent dispersion being present in the water repellent and mold inhibiting composition in an amount from about 3% to about 10% by weight,
        a mold inhibiting composition comprising a mold inhibiting agent and a defoamer, the defoamer comprising an oil carrier and a defoaming agent, the mold inhibiting composition being present in the water repellent and mold inhibiting composition in an amount from about 7% to about 20% by weight, the defoamer being present in the water repellent and mold inhibiting composition in an amount of at least about 0.1% by weight, and
        water; and
    thereafter drying the paper web to form a paper product.

2. The process of claim 1, further comprising laminating the paper product to a core comprising gypsum to form a dry wall product.

3. The process of claim 1, wherein the side of the paper web treated with the water repellent and mold inhibiting composition has a Cobb water absorption value of less than about 100 grams per m2.

4. The process of claim 1, wherein the mold inhibiting agent comprises a pyrithione, and the defoaming agent comprises hydrophobic silica particles.

5. The process of claim 1, wherein the paper product has a basis weight of from about 38 lbs per MSF to about 50 lbs per MSF.

6. The process of claim 1, wherein the water repellent and mold inhibiting composition is applied to the paper web while the paper web is at a solids content of from about 80% to about 95%.

7. The process of claim 1, wherein the defoamer is present on the paper product in an amount of from about 10 grams per MSF to about 50 grams per MSF in the paper product.

8. The process of claim 1, wherein the oil carrier comprises a hydrocarbon oil.

9. The process of claim 1, wherein the oil carrier comprises mineral oil, vegetable oil, or a white oil.

10. The process of claim 1, wherein the defoaming agent comprises hydrophobic silica particles.

11. The process of claim 1, wherein the water repellent and mold inhibiting composition further comprises a wax.

12. The process of claim 11, wherein the wax comprises a stearamide wax, a paraffin wax, an ester wax, or a fatty alcohol wax.

13. The process of claim 1, wherein the mold inhibiting agent comprises a pyrithione.

14. The process of claim 13, wherein the pyrithione comprises zinc pyrithione particles, and at least 90% of the zinc pyrithione particles have a particle size of less than 2 micron.

15. The process of claim 1, wherein the water repellent and mold inhibiting composition further contains zinc oxide particles.

16. The process of claim 1, wherein the agent comprises sodium pyrithione.

17. The process of claim 1, wherein the water repellent agent comprises a silicone copolymer.

* * * * *